US006843139B2

(12) United States Patent
Schumacher et al.

(10) Patent No.: US 6,843,139 B2
(45) Date of Patent: Jan. 18, 2005

(54) FLOW INSTRUMENT WITH MULTISENSORS

(75) Inventors: Mark S. Schumacher, Minneapolis, MN (US); David A. Broden, Andover, MN (US); David E. Wiklund, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/387,088

(22) Filed: Mar. 12, 2003

(65) Prior Publication Data

US 2004/0177703 A1 Sep. 16, 2004

(51) Int. Cl.$^7$ ................................................ G01F 1/37
(52) U.S. Cl. .................................................... 73/861.52
(58) Field of Search ........................ 73/861.42, 861.52, 73/700

(56) References Cited

U.S. PATENT DOCUMENTS

| | | | |
|---|---|---|---|
| 3,792,609 A | 2/1974 | Blair et al. ..................... 73/205 |
| 5,332,005 A | 7/1994 | Baan ........................... 138/43 |
| 5,469,749 A | 11/1995 | Shimada et al. .......... 73/861.47 |
| 5,672,832 A * | 9/1997 | Cucci et al. ............. 73/861.52 |
| 6,089,097 A | 7/2000 | Frick et al. .................... 73/718 |
| 6,119,710 A | 9/2000 | Brown ......................... 137/14 |
| 6,119,730 A | 9/2000 | McMillan ..................... 138/43 |
| 6,138,990 A | 10/2000 | Drexel ..................... 251/335.2 |
| 6,143,080 A | 11/2000 | Bartholomew et al. ..... 118/718 |
| 6,152,162 A | 11/2000 | Balazy et al. ............... 137/110 |
| 6,182,019 B1 | 1/2001 | Wiklund ..................... 702/100 |
| 6,311,568 B1 | 11/2001 | Kleven ..................... 73/861.42 |
| 6,333,272 B1 | 12/2001 | McMillin et al. ........... 438/710 |
| 6,352,001 B1 | 3/2002 | Wickert et al. .......... 73/861.52 |
| 6,354,150 B1 | 3/2002 | Rudent et al. ............. 73/202.5 |
| 6,363,958 B1 | 4/2002 | Ollivier .......................... 137/2 |
| 6,592,253 B2 * | 7/2003 | Nyffenegger et al. ........ 374/143 |
| 6,609,431 B1 * | 8/2003 | Tietsworth et al. ...... 73/861.52 |
| 6,655,207 B1 * | 12/2003 | Speldrich et al. .......... 73/202.5 |
| 6,742,394 B1 * | 6/2004 | Stuttaford et al. ............. 73/700 |
| 2002/0046612 A1 | 4/2002 | Mudd ....................... 73/861.52 |
| 2004/0134284 A1 * | 7/2004 | Gleeson et al. ............... 73/756 |

FOREIGN PATENT DOCUMENTS

| | | |
|---|---|---|
| JP | 07128103 | 5/1995 |
| JP | 2001-141532 | 5/2001 |

OTHER PUBLICATIONS

"High Purity Porous Metal Flow Restrictors," Mott Corporation High Purity Products, pp. 1–4 from www.mottcorp.com and cover sheet, Jan. 9, 2003.
"High Purity Porous Metal Flow Restrictors, Mott Corporation," 2 page article and cover sheet, Jan. 9, 2003.
*MEMS–Flow, Model 9900 User Manual*, Redwood Microsystems Inc., 2001, cover, pp. 2–21 with attached 10 page article dated Apr. 2000.
*MEMS–Flow Shut–Off Valve T–Package User Manual*, Redwood Microsystems, Inc., 2000, pp. 1–7 and 5 page attachment.

(List continued on next page.)

*Primary Examiner*—Edward Lefkowitz
*Assistant Examiner*—Corey D. Mack
(74) *Attorney, Agent, or Firm*—Westman, Champlin & Kelly (57) ABSTRACT

An instrument used to control fluid flow. The instrument has a flow restrictor between an inlet and an outlet. First and second multisensor have sensing surfaces in the inlet and outlet that sense pressures and temperatures of the fluid flow. A circuit generates a mass flow output based on a difference between the pressure in the inlet and the pressure in the outlet. The mass flow output including a temperature correction as a function of at least one of the sensed temperatures in the inlet and outlet.

30 Claims, 4 Drawing Sheets

OTHER PUBLICATIONS

Swagelok Company, May 2002, "VCO Fittings Installation Instructions," pp. 7 and 9.

FuGasity Corporation, Criterion, "Ultra High Purity Flow Controller," 4 page article, 2001.

Brooks Instrument, "UHP Models 6950/51 to 6960/61," Design Specifications, pp. 1–5, May 2000.

Brooks Instrument, "Model 0550E," Design Specifications, 4 pages article, Aug. 1998.

Brooks Instrument, "Model 6256S," Design Specification, 8 page article, Oct. 2001.

MKS Technology for Productivity, "Pressure–Based Mass–Flo Controller for Ion Implant Applications Type 1640," 4 page article, 2001.

MKS Instruments, Vapor Source Mass–Flo Controllers Types 1150C and 1152C, 4 page article, 1999.

Notification of Transmittal of the International Search Report and the Written Opinion of the International Searching Authority, or the Declaration for International Application No. PCT/US2004/007321 (filed Mar. 11, 2004): date of mailing Aug.19, 2004.

* cited by examiner

FLOW INSTRUMENT WITH MULTISENSORS

FIELD OF THE INVENTION

The invention relates to instruments for use in controlling fluid flow. In particular, the invention relates to control of the flow of high purity fluids in the manufacture of semiconductor devices.

BACKGROUND OF THE INVENTION

Instruments such as mass flow controllers, pressure transmitters and temperature transmitters are used in the manufacture of semiconductor devices such as microprocessors and application specific integrated circuits (ASIC's). The instruments include sensors that are used to measure and control the flow of various fluids used in the semiconductor manufacturing processes. Making fluid connections to multiple individual sensors is cumbersome, increases the number of fluid seals around sensors and increases the possibility of fluid leaks and/or errors due to differing process conditions at the various sensors. A method of simplifying instrument installation and reducing the number of sensor connections is needed.

SUMMARY OF THE INVENTION

Disclosed are an instrument and a method for controlling fluid flow. The instrument comprises a flow body that includes an inlet, an outlet and a flow restrictor that couples the fluid flow from the inlet to the outlet.

The instrument comprises a first multisensor having a first sensing surface in the inlet that senses pressure and temperature of the fluid. The instrument also comprises a second multisensor having a second sensing surface in the outlet that senses pressure and temperature of the fluid.

The first and second multisensors are coupled to a circuit in the instrument. The circuit generates a fluid flow output based on outputs of the first and second multisensors. The fluid flow output includes a temperature correction as a function of at least one of the sensed temperatures in the inlet and outlet.

These and various other features as well as advantages that characterize the present invention will be apparent upon reading of the following detailed description and review of the associated drawings.

DESCRIPTION OF ILLUSTRATIVE EMBODIMENTS

In the embodiments described below, a method and instrument for use in controlling fluid flow are disclosed. The instrument includes an inlet multisensor and an outlet multisensor that each sense both pressure and temperature at both ends of a flow restrictor that carries the fluid flow. Each multisensor includes both a pressure sensor and a temperature sensor sensing at a common sensing surface. The sensing surface is immersed in the flowing fluid and the temperature that is sensed is both the temperature of the flowing fluid and the temperature of the pressure sensor. The temperatures sensed can be used to provide temperature correction to the pressure sensor, and also to provide a temperature reading used to compute mass flow. The number of piping connections and electrical connections is reduced by using multisensors and by putting many functions in a single instrument to simplify installation.

In the embodiments illustrated below, an instrument that senses flow of clean fluids (gas or liquid) is accurate without having to rely on reducing outlet pressure down to atmospheric pressure (calibration with an open outlet or exhaust from the instrument), does not require gasses to be at or near calibration conditions (same pressure, temperature or density as calibration conditions) and does not require a bypass arrangement where flow is split between a main flow and a sensed flow in a proportional leg. In the arrangements illustrated below, an instrument can be constructed in which a multisensor wetted material is sapphire for corrosion resistance and compatibility with a wide variety of clean fluids. In the arrangements illustrated below, the sensor does not require an isolation fluid such as silicone oil or Fluorinert®, and there is therefore no danger of an isolation fluid contaminating the clean process fluid, even under fault conditions where the multisensor is mechanically damaged.

Figure 1:
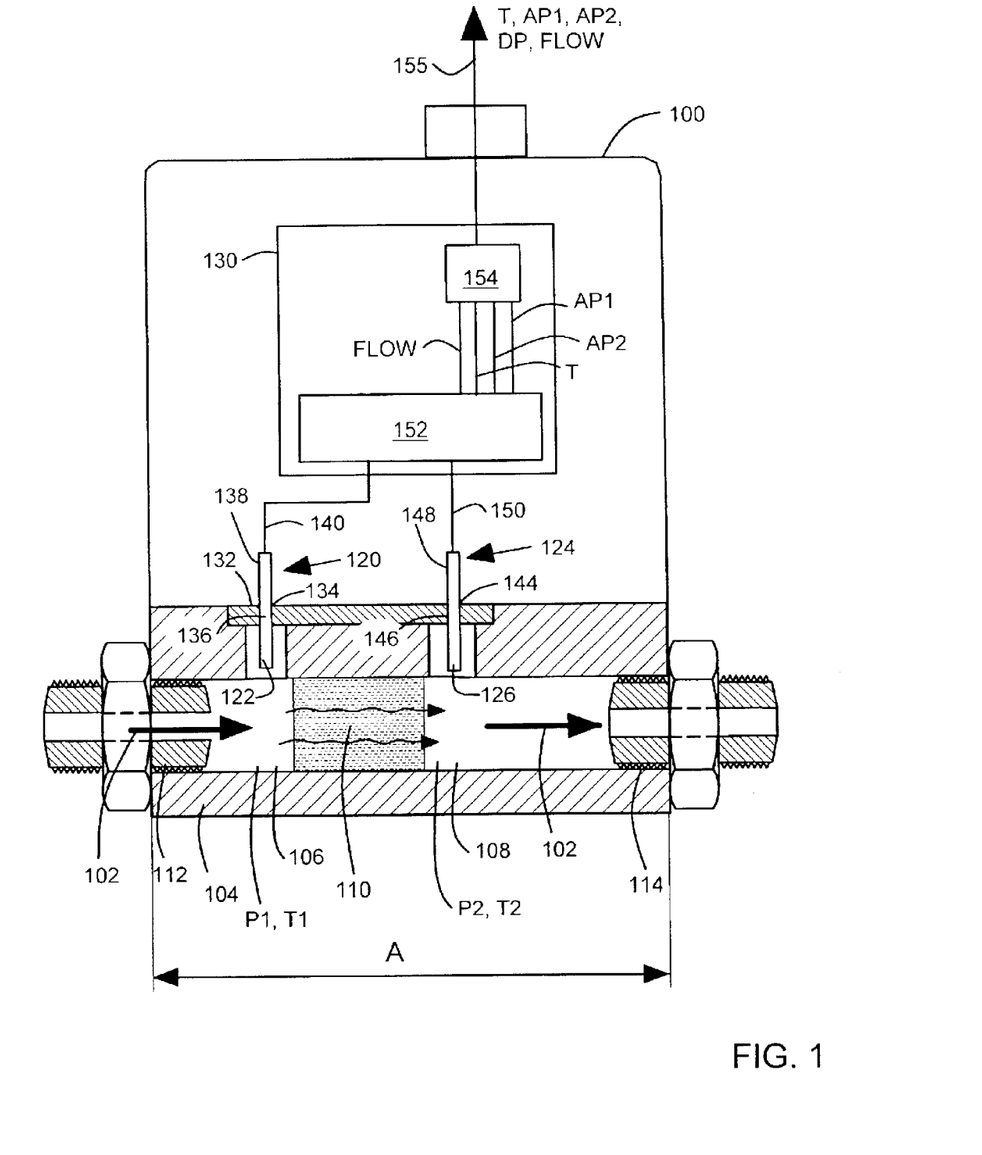
FIG. 1 illustrates a first embodiment of a fluid flow instrument.

FIG. 1 illustrates a first embodiment of a fluid flow instrument 100 that can be used in measuring or sensing a fluid flow 102. The instrument 100 comprises a flow body 104 that includes an inlet 106, an outlet 108 and a flow restrictor 110 coupling the fluid flow 102 from the inlet 106 to the outlet 108. The flow restrictor 110 is preferably a cylindrically shaped mass of porous material with multiple pores as illustrated. The inlet 106 and the outlet 108 preferably included threaded fitting 112, 114, such as Swagelok® VCO® fittings, for convenient connection to fluid pipes. The instrument 100 can be used in a manufacturing plant to deliver precisely measured flows of very small quantities of clean fluids used in manufacturing semiconductor devices.

The instrument 100 includes a first multisensor 120 having a first sensing surface 122 in the inlet 106. The first sensing surface 122 senses both the pressure P1 and the temperature T1 of the fluid flow 102 in the inlet 106. The instrument 100 includes a second multisensor 124 having a second sensing surface 126 in the outlet 108. The second sensing surface 126 senses both the pressure P2 and the temperature T2 of the fluid flow 102 in the outlet 108.

The flow restrictor 110 generates a pressure drop, also called a pressure differential (P1–P2), in the fluid flow 102 between the inlet 106 and the outlet 108.

The first and second multisensors 120, 124 couple to a circuit 130 in the instrument 100. The circuit 130 preferably generates a fluid flow output on line 155 based on a difference (P1–P2) between the pressure P1 sensed in the inlet 106 and the pressure P2 sensed in the outlet 108. The fluid flow output on line 155 preferably includes a temperature correction as a function of at least one of the sensed temperatures T1, T2 in the inlet 106 and outlet 108 respectively and the fluid flow output preferably represents mass flow. In a preferred arrangement, the circuit 130 is programmable to provide a desired function for each application. Functional algorithms can be selected (from routines stored in circuit 130) by commands received on line 155 or by downloading an application program from line 155 to the circuit 130 and storing the application program in nonvolatile memory in the circuit 130.

The inlet 106 is sealed and separated from the circuit 130 by a multisensor carrier plate 132. A first hole 134 passes through the multisensor carrier plate 132. The first multisensor 120 has a central neck portion 136 filling the first hole 134 and an output lead portion 138 outside of the inlet 106. The central neck portion 136 is preferably sealed to the first hole 134. This arrangement provides fluid isolation such that the flowing fluid 102 does not come in contact with and does not corrode multiple leads 140 connected to the lead portion 138 and the circuit 130.

The outlet 108 is sealed and separated from the circuit 130 by the multisensor carrier plate 132. A second hole 144 passes through the multisensor carrier plate 132. The second multisensor 124 has a central neck portion 146 filling the second hole 144 and an output lead portion 148 outside of the outlet 108. The central neck portion 146 is preferably sealed to the first hole 144. This sealing arrangement provides fluid isolation such that the flowing fluid 102 does not come in contact with and does not corrode multiple leads 150 connected to the lead portion 148 and the circuit 130.

In a further preferred arrangement, the first and second multisensors 120, 124 have respective first and second central sensor shafts 136, 146 extending from the respective first and second sensing surfaces 122, 126 to respective first and second electrical connection ends 138, 140. The multisensor carrier plate 132 has first and second through-holes 134, 144 that are sealed to the respective first and second central sensor shafts 136, 146 and, provide fluid isolation between the fluid and the first and second electrical connection ends.

As can be seen in FIG. 1, the multisensors 120, 124 provide measurement of four fluid properties, namely pressures P1, P2 and temperatures T1, T2 with only two sensor seals at 136, 146. The instrument 100 uses only one inlet connection 112 and one outlet connection 114 to make measurements of these four fluid properties. The use of the multisensors 120, 124 allows for a very compact "footprint" for the flow body 104 in instrument 100. In a preferred arrangement, the flow body 104 has a laying length "A" between inlet fittings of no more than about 106 mm., and has a width transverse to the laying length of no more than about 38 mm. The overall "footprint" of the flow instrument (without threaded fittings) is preferably about 38×106 mm.

In one preferred arrangement, the circuit 130 also generates absolute pressure outputs AP1, AP2 on line 155 as a function of the pressures P1, P2 sensed at the inlet and outlet respectively. In another preferred arrangement, the circuit 130 also generates a temperature output T on line 155 as a function of one or both of the temperatures T1, T2. The temperature output can be T1, T2, an average of T1 and T2, a difference between T1 and T2 or a ratio T1/T2 depending on the needs of the application. The circuit 130 preferably comprises a computing circuit 152 that calculates the outputs FLOW, T, AP1, AP2 and provides the outputs to a modem 154 which provides all of the outputs on a single serial bus line 155 in a standard industry communication protocol such as HART, PROFIBUS, FOUNDATION FIELDBUS, CONTROLLER AREA NETWORK (CAN) or another standard serial communication protocol. In one preferred arrangement, the serial bus line 155 preferably comprises a two wire, 4–20 mA industrial standard loop that provides all of the electrical energization or power for the fluid flow instrument and has bidirectional HART serial communication signals superimposed on the 4–20 mA loop current. In a further preferred arrangement, the circuit 130 is arranged to have an intrinsically safe interface to the two wire 4–20 mA loop, and the circuitry 130 and its connections to the multisensors 120, 124 are housed in an explosion proof housing. In some applications, multiple analog outputs can also be provided.

In another preferred arrangement, the restrictor 110 can be sized such that the fluid flow 102 through the restrictor 110 is in a range of laminar flow. This arrangement using a laminar flow range provides a linear relationship between the pressure drop (P1–P2) and the mass flow rate of the fluid flow 102. The difficulties of calibrating and using flow meters that provide a square root relationship between pressure drop and flow rate are thus avoided. The flow restrictor 110 preferably comprises a mass of porous material such as silicon or metal. The particular material of the flow restrictor 110 is selected for compatibility with the fluid and has multiple pores.

Various configurations of the instrument 100 can be made depending on whether the fluid is a liquid or a gas, and the piping and electrical interfacing needs of the application. In one preferred arrangement, a velocity of the fluid in the mass of porous material 110 is selected to be in a velocity range such that the fluid flow output on line 155 is a function of the inlet pressure, and substantially independent of the outlet pressure. In another preferred arrangement, the instrument 100 has the mass flow output on line 155 that is substantially a linear function of the inlet pressure. In yet another preferred arrangement, the fluid flow in the mass of porous material 110 is a laminar flow. The fluid flow output on line 155 can be a function of a difference between the inlet pressure P1 and the outlet pressure P2.

In one preferred arrangement, the circuit 155 can be programmed to provide a single or multiple outputs on line 155 selected from the group of pressure, temperature and fluid flow variables.

The multisensors 120, 124 can be made, for example, as shown in FIGS. 7–10 of U.S. Pat. No. 6,089,097 Frick et al. which is hereby incorporated herein, in its entirety, by reference. Another example of a multisensor is described below in connection with FIG. 2.

Figure 2:
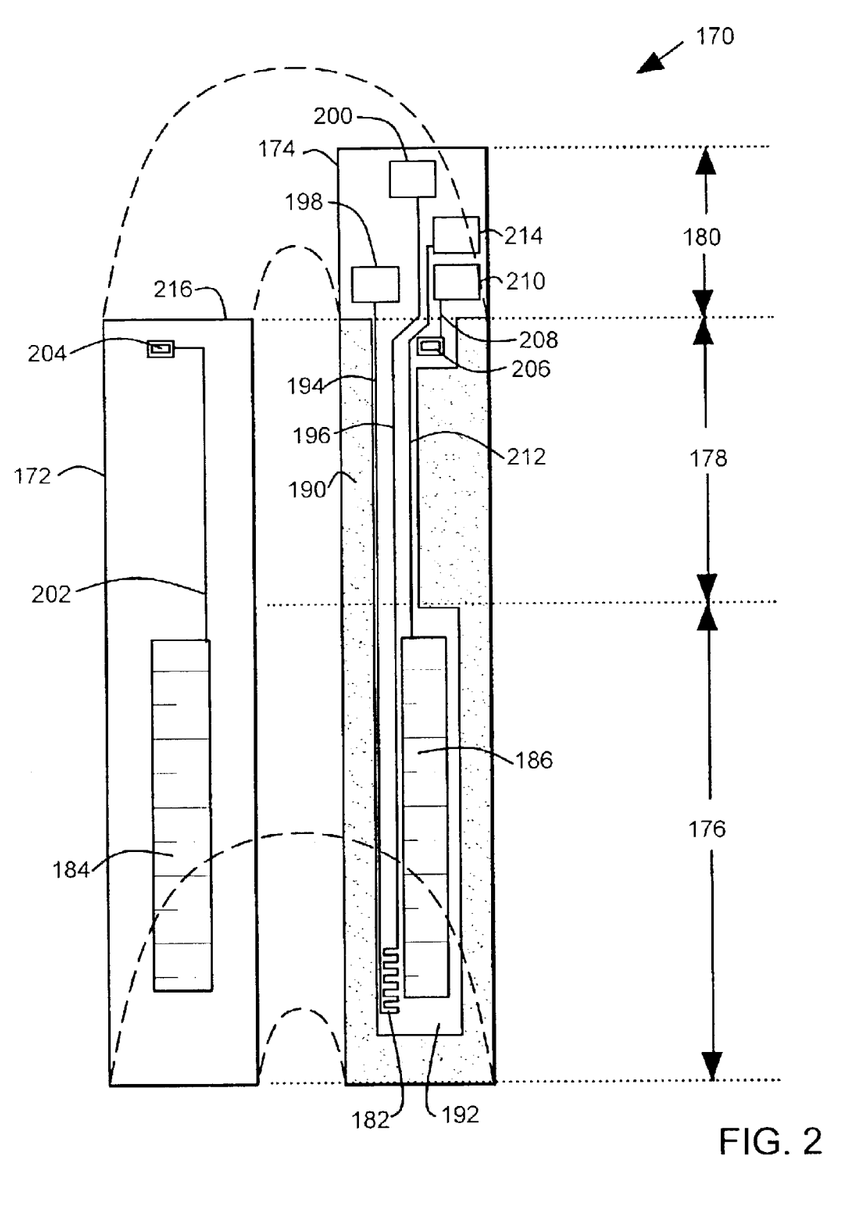
FIG. 2 illustrates an embodiment of a multisensor.

FIG. 2 illustrates an exploded view of an embodiment of a multisensor 170. Multisensor 170 comprises a first layer 172 and a second layer 174 that are formed of corrosion resistant, electrically insulating material such as synthetic single crystal alumina (sapphire) or quartz. In the exploded view in FIG. 2, the internal faces of the first layer 172 and the second layer 174 are illustrated. The back (external) sides of first and second layer 172 that are hidden from view in FIG. 2 are external to the assembled multisensor 170 and are preferably flat and featureless.

The multisensor 170 has an elongated shape extending from a sensing region 176 through a neck region 178 to a lead end region 180. The neck region 178, also called a central sensor shaft 178, is preferably externally metallized (as shown for example, in FIG. 3) for soldering to the multisensor carrier plate 132 as explained in more detail below in connection with FIG. 3. The flat back surfaces (not illustrated in FIG. 2) in the sensing region 176 include sensing surfaces that are opposite a temperature sensor 182 and a capacitive pressure sensor that includes metal capacitor plates (also called electrodes) 184, 186. A mesa or raised portion 190 (graphically identified by a stippled appearance in FIG. 2) surround the capacitor plate 186 and the temperature sensor 182. The capacitor plate 186 and the temperature sensor 182 are in a shallow cavity 192 surrounded by the mesa 190. The arrangement of the mesa 190 and the shallow cavity 192 provide a spacing between the capacitor plates 184 and 186 when the two layers 172, 174 are bonded together.

The temperature sensor 182 is electrically connected by leads 194, 196 to lead bonding pads 198, 200 in the lead end region 180. Leads 194, 196 pass through the neck region 178.

The capacitor plate 184 is electrically connected by a lead 202 to a first interlayer contact 204. When the two layers 172, 174 are bonded together, the first interlayer contact 204 on layer 172 makes electrical contact with a second interlayer contact 206 on the layer 174. The second interlayer contact 206 is connected by a lead 208 to a lead bonding pad 210. The capacitor plate 186 is electrically connected by a lead 212 to a lead bonding pad 214. The leads 202, 212 pass through the neck region 178.

The two layers 172, 174 are bonded together preferably by means of a direct bond between polished sapphire surfaces of the mesa 190 and the layer 172. Direct bonding is preferred because no bonding material is needed to bond the layers 172, 174 together and the entire external surface of the sensor 170 in the sensing region 176 is formed of sapphire, which is resistant to corrosion by many fluids used in semiconductor manufacturing. The exposed sapphire sensing surface can be in direct contact with the fluid and no isolator fluid and isolator diaphragm need to be added. After the two layers 172, 174 are bonded together, a frit can be applied along edge 216 to seal a vacuum in the cavity 192 such that the multisensor senses absolute pressure (AP).

In operation, the multisensor 170 includes capacitor plates 184, 186 that are spaced apart from one another to form a pressure sensing capacitance. The pressure surrounding the sensing region 176 deflects the layers 172, 174 in the sensing region to effectively vary the spacing between the capacitor plates 184, 186 and vary the capacitance as a function of the sensed pressure. The sensing region 176 is immersed in the fluid and the temperature sensor 182 senses the temperature of both the fluid and the pressure sensor. In a preferred arrangement, the temperature sensor 182 senses both the temperature of the multisensor 170 and the temperature of the surrounding fluid and is used by the circuit 130 to temperature correct the output of the capacitive pressure sensor and also correct the mass flow calculation for temperature.

The external sensing surfaces of the multisensor 170 are sapphire and are in direct contact with the fluid. The layers 172, 174 form a sapphire multisensor shell with a capacitance pressure sensor and a temperature sensor formed inside the sapphire multisensor shell. The temperature sensor 182 and the capacitive pressure sensor are inside the shell and protected from contact with the fluid. The sapphire multisensor shell fluid-isolates the pressure sensor and the temperature sensor from the fluid.

In a preferred arrangement, a multisensor 170 is sized to have a 100 psi upper range limit to provide a good combination of ruggedness and accuracy for typical clean flow ranges in semiconductor processing plants.

Figure 3:
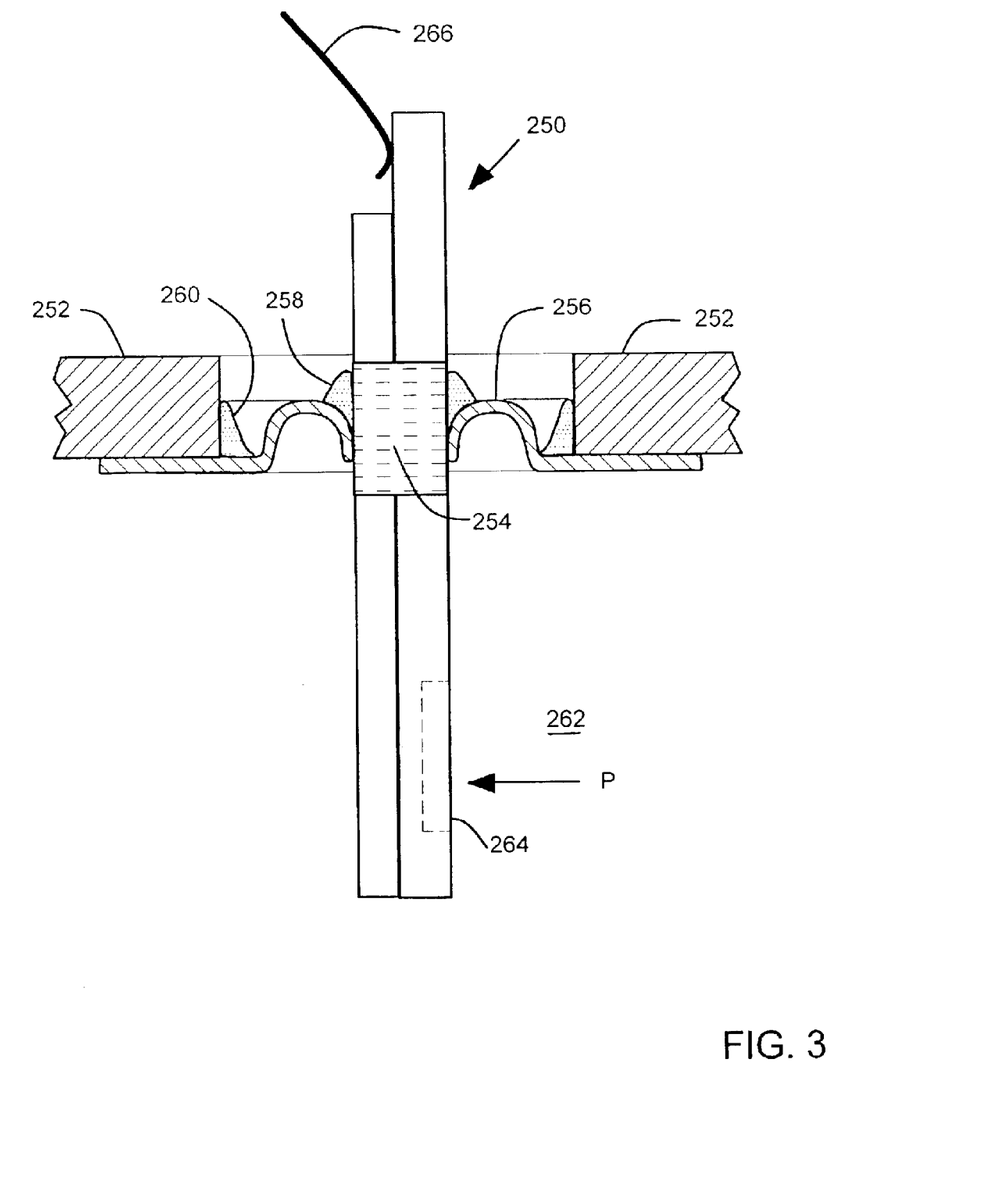
FIG. 3 illustrates an embodiment of a multisensor carrier plate.

FIG. 3 illustrates a preferred mounting of a multisensor 250 in a multisensor carrier plate 252. The multisensor 250 includes a metallized neck region 254 which is a solderable surface, preferably electrodeposited nickel. A stress relief plate 256, preferably formed of electroformed sheet metal, is soldered to the neck region 254 by a circular solder joint 258. The electroformed sheet metal stress relief plate 256 is welded to the multisensor carrier plate 252 by a circular weld joint 260. The arrangement provides a fluid seal so that pressurized fluid 262 at pressure P can reach a sensing surface 264, while the leads 266 are fluid isolated from the fluid 262 behind the multisensor carrier plate 252.

Figure 4:
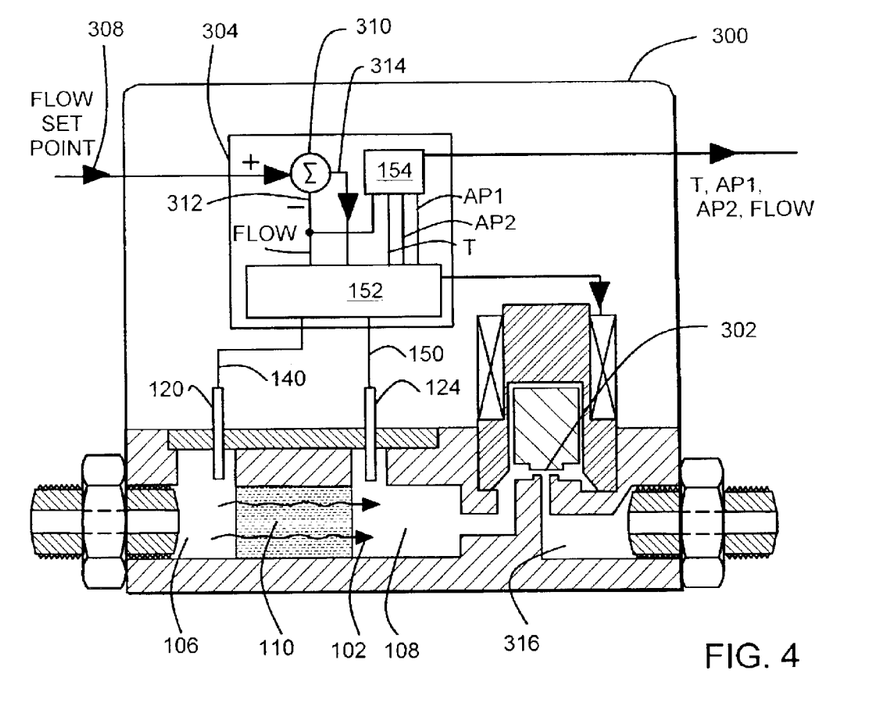
FIG. 4 illustrates a second embodiment of a fluid flow instrument that includes a valve.

FIG. 4 illustrates a second embodiment of a fluid flow instrument 300 that includes a valve 302. Fluid flow instrument 300 is similar in many respects to the instrument 100 illustrated in FIG. 1, however the instrument 300 includes the electrically actuated valve 302 and modified circuitry 304 that controls the valve 302 to regulate the flow rate as a function of the flow output FLOW. Circuitry 304 provides a closed control loop that is entirely within the instrument 300. Reference numbers used in FIG. 4 that are the same as reference numbers used in FIG. 1 refer to the same or comparable features.

The circuitry 304 receives a fluid flow setpoint 308 that is selected by the user. The setpoint 308 can be a manual adjustment or an electrical input received from a control system that indicates the desired fluid flow rate for the application. The circuitry 304 includes a summing point 310 that compares the fluid flow setpoint 308 to the sensed fluid flow 312 and provides a difference signal (also called an error signal) at 314. Computing circuitry 152 controls the opening of the valve 302 as a function of the difference signal 314 to regulate the fluid flow of the fluid 102 at a valve outlet 316.

The valve 302 is coupled to the flow body to receive fluid from outlet 108. Circuitry 304 functions as a control circuit that couples an electrical signal to the valve 302 and controls the fluid flow as a function of the flow output and the flow setpoint 308. An algorithm for controlling opening of the valve 302 can be any combination of proportional, integral and derivative control actions, commonly called P, PI, PD, PID control.

The arrangement shown in FIG. 4 has only two threaded connections to the user's piping at inlet 106 and valve outlet 316. The arrangement shown in FIG. 4 preferably provides sensing of fluid flow, sensing of line pressure and outlet pressure, sensing of fluid temperature and a valve controlling the flow in a single compact package.

In a preferred arrangement, the set point 308 (which is an input) and the outputs T, AP1, AP2, FLOW are all on a single serial bus line in a standard industry communication protocol such as HART, PROFIBUS, FOUNDATION FIELDBUS, CONTROLLER AREA NETWORK (CAN) or another standard serial communication protocol. In one preferred arrangement, the serial bus line preferably comprises a two wire, 4–20 mA loop that provides all of the electrical energization or power for the fluid flow instrument and has bidirectional HART serial communication signals superimposed on the 4–20 mA loop current. In a further preferred arrangement, the circuit 304 is arranged to have an intrinsically safe interface to the two wire 4–20 mA loop, and the circuitry 304 and its connections to the multisensors 120, 124 are housed in an explosion proof housing. In some applications, multiple analog outputs can be provided.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the fluid flow instrument while maintaining substantially the same functionality without departing from the scope and spirit of the present invention. The teachings of the present invention can be applied to other fluid flow instruments without departing from the scope and spirit of the present invention.

What is claimed is:

1. An instrument for use in sensing fluid flow, comprising:
   a flow body comprising an inlet, an outlet and a flow restrictor coupling the fluid flow from the inlet to the outlet;
   a first multisensor having a first sensing surface immersed in the inlet that senses an inlet pressure and temperature of the fluid, the first multisensor passing through a first sensor seal;
   a second multisensor having a second sensing surface immersed in the outlet that senses an outlet pressure and temperature of the fluid, the second multisensor passing through a second sensor seal; and
   a circuit that couples to the first and second multisensors, the circuit generating a fluid flow output based on outputs of the first and second multisensors, the fluid flow output including a temperature correction as a function of at least one of the sensed temperatures in the inlet and the outlet, the circuit being fluid isolated from the fluid flow by the first and second sensor seals.

2. The instrument of claim 1 wherein the flow restrictor comprises a mass of porous material coupling the fluid from the inlet to the outlet.

3. The instrument of claim 2 wherein a velocity of the fluid in the mass of porous material is in a velocity range such that the fluid flow output is a function of the inlet pressure, and substantially independent of the outlet pressure.

4. The instrument of claim 3 wherein the fluid flow output is substantially a linear function of the inlet pressure.

5. The instrument of claim 3 wherein the fluid flow in the mass of porous material is a laminar flow.

6. The instrument of claim 1 wherein the fluid flow output is a function of the inlet pressure and the outlet pressure.

7. The instrument of claim 6 wherein the fluid flow output is a function of a difference between the inlet pressure and the outlet pressure.

8. The instrument of claim 1 wherein the circuit generates multiple outputs selected from the group of pressure, temperature and flow variables.

9. The instrument of claim 1 wherein the circuit generates a temperature output.

10. The instrument of claim 1 wherein the first and second multisensors have respective first and second central sensor shafts extending from the respective first and second sensing surface to respective first and second electrical connection ends, the instrument further comprising a multisensor carrier plate having first and second through-holes that are sealed to the respective first and second central sensor shafts, providing isolation between the fluid and the first and second electrical connection ends.

11. The instrument of claim 1 wherein the first sensing surface comprises sapphire.

12. The instrument of claim 11 wherein the second sensing surface comprises sapphire.

13. The instrument of claim 1 wherein the first and second sensing surfaces are in direct contact with the fluid flow.

14. The instrument of claim 1 wherein the first and second multisensors each comprise a sapphire multisensor shell with a pressure sensor and a temperature sensor formed inside each sapphire multisensor shell.

15. The instrument of claim 14 wherein the sapphire multisensor shell fluid-isolates the pressure sensor and the temperature sensor from the fluid.

16. The instrument of claim 14 wherein the temperature sensor senses both the temperature of the fluid and the temperature of the pressure sensor.

17. The instrument of claim 1 wherein the first and second multisensors sense absolute pressures.

18. The instrument of claim 1 wherein the flow restrictor comprises porous metal with a plurality of pores.

19. The instrument of claim 1 wherein the flow restrictor comprises porous silicon with a plurality of pores.

20. The instrument of claim 1, further comprising:
   a valve coupled to the flow body; and
   a control circuit coupled to the valve and controlling the fluid flow as a function of the outlet fluid flow and a flow setpoint.

21. The instrument of claim 20 wherein the control circuit controls the valve with a proportional control algorithm.

22. The instrument of claim 20 wherein the control circuit controls the valve with a proportional-integral control algorithm.

23. The instrument of claim 20 wherein the control circuit controls the valve with a proportional-integral-derivative control algorithm.

24. The instrument of claim 20 wherein the control circuit controls the valve with a proportional-derivative control algorithm.

25. The instrument of claim 20 wherein the flow body has a laying length between inlet fittings of no more than about 106 mm.

26. The instrument of claim 25 wherein the flow body has a width transverse to the laying length of no more than about 28 mm.

27. A method of controlling fluid flow through an instrument, comprising:
   coupling the fluid flow from an inlet to an outlet through a flow restrictor;
   sensing an inlet pressure and temperature of the with a first multisensor having a first sensing surface immersed in the inlet;
   sensing an outlet pressure and temperature of the fluid with a second multisensor having with a second sensing surface immersed in the outlet;
   coupling the first and second multisensors to a circuit generating a fluid flow output;
   passing the first and second multisensors through first and second sensor seals that fluid isolate the circuit from the fluid flow; and
   generating the fluid flow output based on the pressure selected from the group of the inlet pressure and the outlet pressure, the fluid flow output including a temperature correction as a function of at least one of the sensed temperatures in the inlet and outlet.

28. The method of claim 27, further comprising forming the flow restrictor from a mass of porous material.

29. The method of claim 28, further comprising selecting a mass of porous material with a pore size such that a velocity of the fluid in the mass of porous material is in a velocity range such that the fluid flow output is a function of the inlet pressure, and substantially independent of the outlet pressure.

30. The method of claim 29 wherein the fluid flow output is substantially a linear function of the inlet pressure.

* * * * *

UNITED STATES PATENT AND TRADEMARK OFFICE
CERTIFICATE OF CORRECTION

PATENT NO. : 6,843,139 B2
DATED : January 18, 2005
INVENTOR(S) : Mark S. Schumacher et al.

It is certified that error appears in the above-identified patent and that said Letters Patent is hereby corrected as shown below:

<u>Column 8,</u>
Line 38, after the word "the" insert -- fluid --
Line 43, delete the second occurrence of "with"

Signed and Sealed this

Twelfth Day of July, 2005

JON W. DUDAS
*Director of the United States Patent and Trademark Office*